United States Patent

Pearson

[11] 4,207,030
[45] Jun. 10, 1980

[54] APPARATUS FOR CONTROLLING LIQUID LEVEL IN A RESERVOIR

[75] Inventor: William S. Pearson, Hampsted, Md.

[73] Assignee: Cypro, Incorporated, Hampstead, Md.

[21] Appl. No.: 724,115

[22] Filed: Sep. 17, 1976

[51] Int. Cl.² .............................. F04B 41/06
[52] U.S. Cl. ........................ 417/7; 417/12; 417/38; 200/183
[58] Field of Search ................ 417/12, 36, 8, 38, 40, 417/41, 37, 305, 3, 4, 5, 7; 137/389, 390; 200/85 R, 182, 183, 187, 220

[56] References Cited

U.S. PATENT DOCUMENTS

| | | | |
|---|---|---|---|
| 1,667,056 | 4/1928 | Smith | 200/187 |
| 2,240,607 | 5/1941 | Buck | 417/38 X |
| 2,377,185 | 5/1945 | Russel | 417/44 X |
| 2,430,775 | 11/1947 | Marchese | 417/38 X |
| 2,707,440 | 5/1955 | Long et al. | 417/12 |
| 2,775,205 | 12/1956 | Gunther | 417/38 |
| 2,780,234 | 2/1957 | Russell | 137/390 |
| 3,223,041 | 12/1965 | Quinn | 417/7 |
| 3,309,474 | 3/1967 | Heinrich | 417/40 |
| 3,413,429 | 11/1968 | Yost | 417/38 X |
| 3,744,932 | 7/1973 | Prevett | 417/7 X |

Primary Examiner—Carlton R. Croyle
Assistant Examiner—Edward Look
Attorney, Agent, or Firm—Hill, Van Santen, Steadman, Chiara & Simpson

[57] ABSTRACT

A balance beam adjustable for a desired liquid level in a reservoir is under the control of a device responsive to pressure head in a main leading from, and reflecting the liquid level in, the reservoir, the beam being in charge of a pump control for one or more pumps for activating the pumps when required when the liquid level drops in the reservoir, whereby to substantially maintain the liquid level. A timer-operated anti-stagnation or anti-icing control device is provided in association with the beam.

23 Claims, 8 Drawing Figures

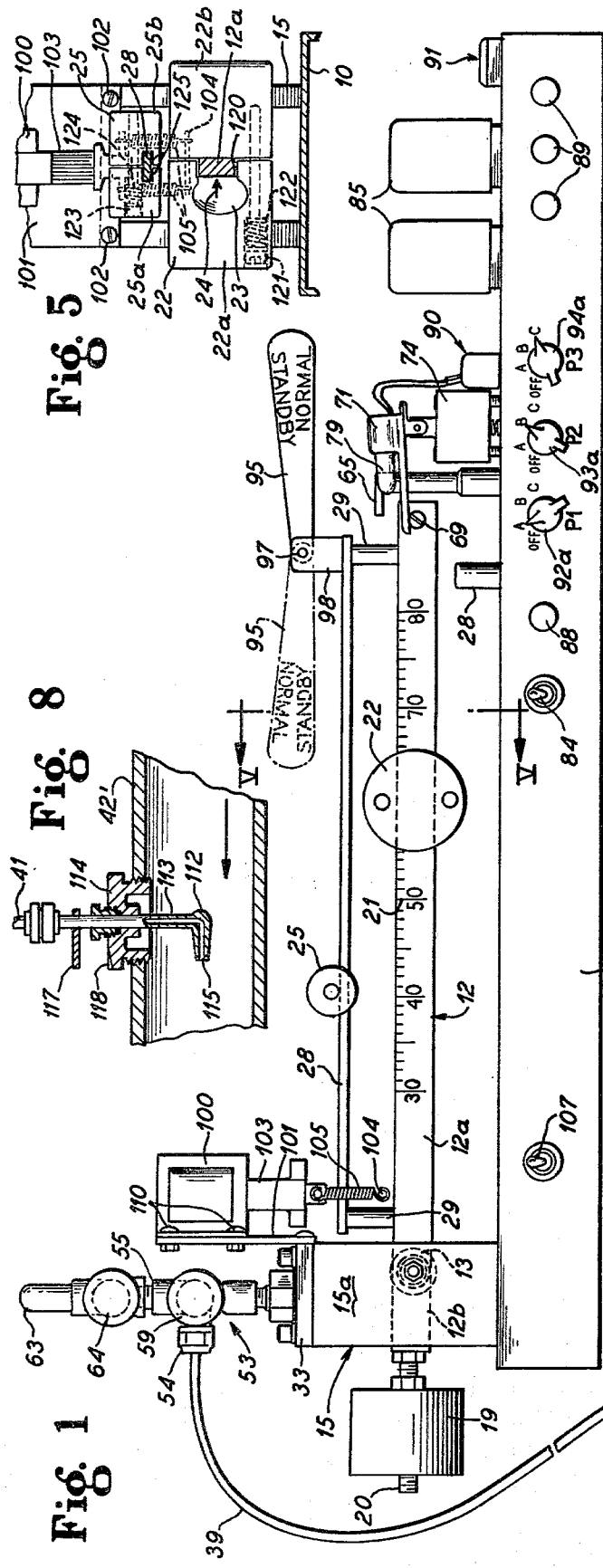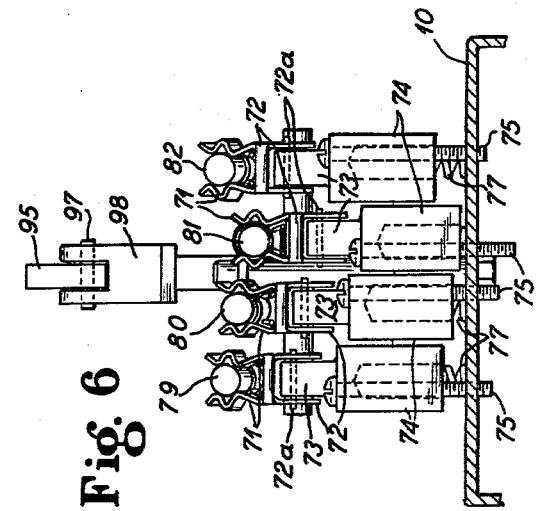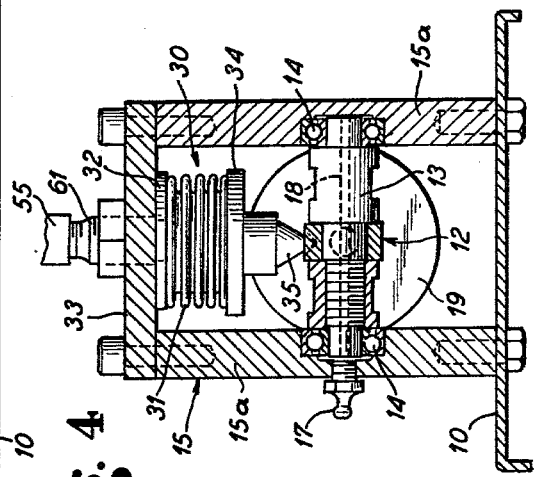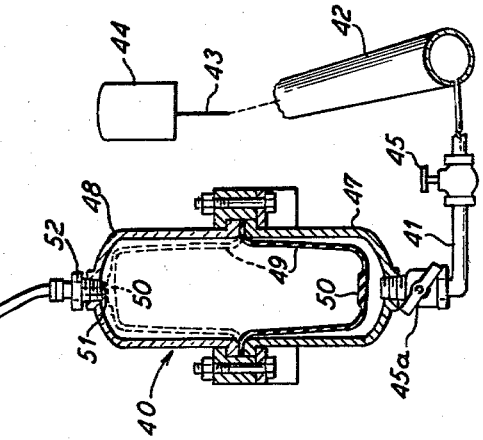

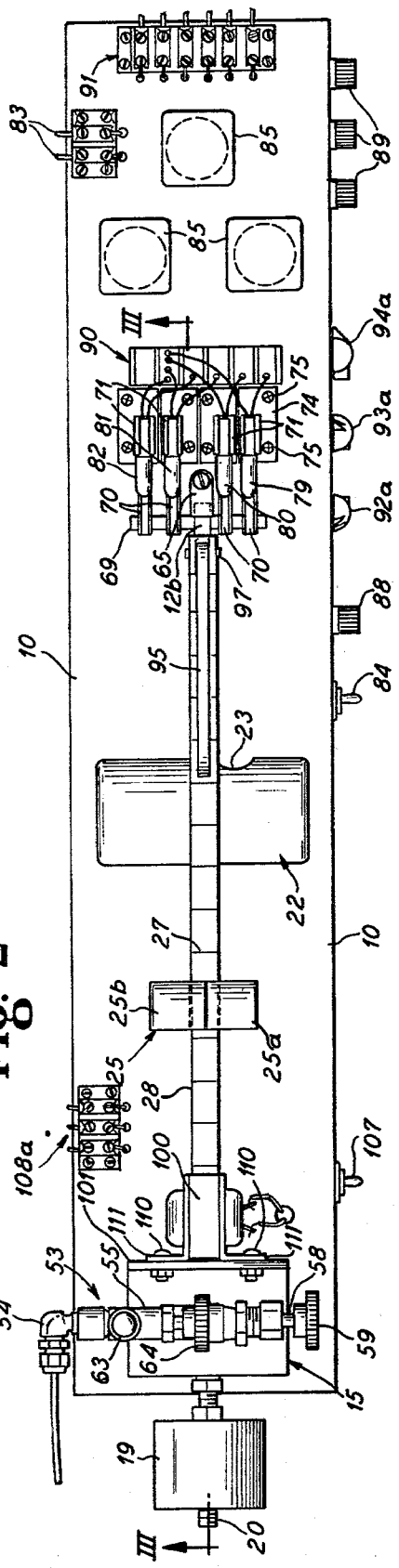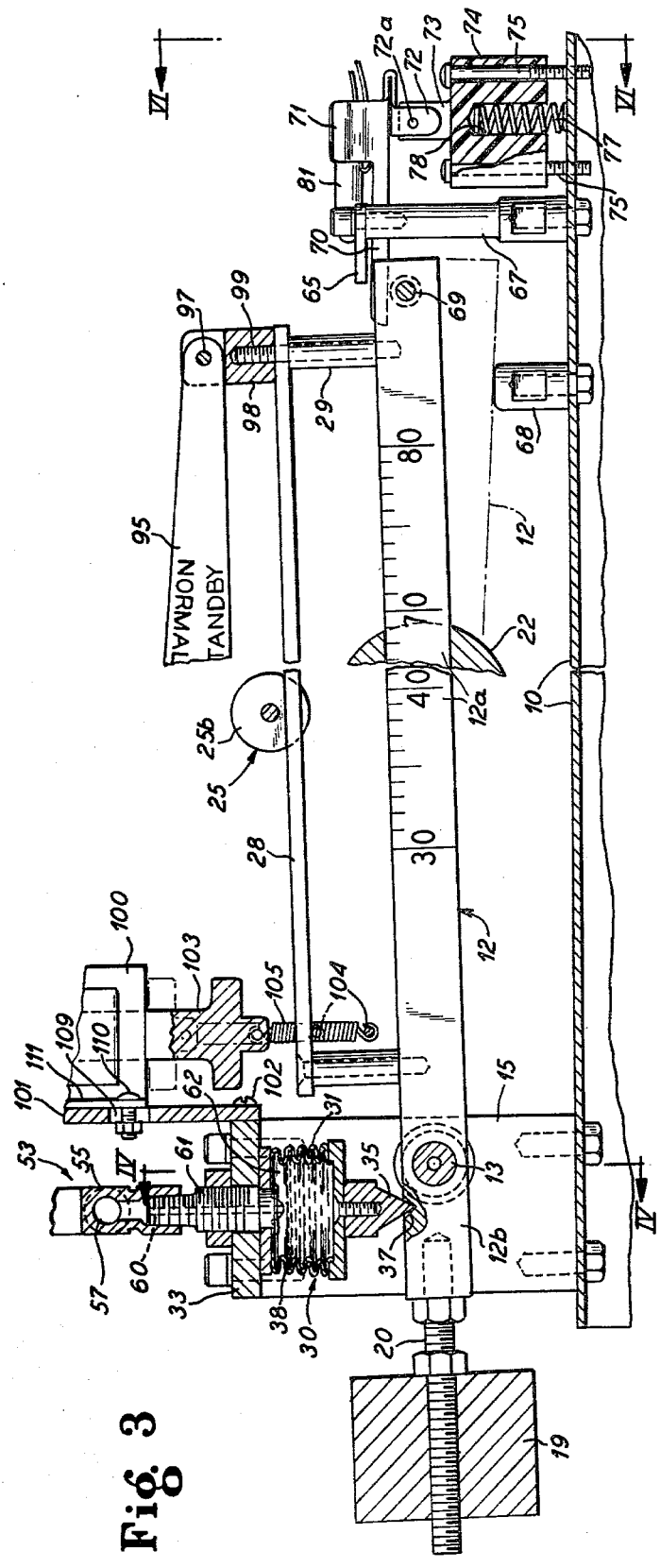

APPARATUS FOR CONTROLLING LIQUID LEVEL IN A RESERVOIR

This invention relates to apparatus for controlling liquid level in a reservoir, and is more particularly concerned with apparatus of this kind which will operate automatically, and to special advantage in municipal water systems.

Municipal water systems are generally equipped with elevated tanks or reservoirs to maintain substantially constant supply line pressure. Such reservoirs are liable to fairly wide range of water demand which may vary widely during certain periods of a daily cycle or unusual demands such as during a fire, and there may be intervals of very low demand or even stagnation such as during nighttime hours. A simple pump control for such reservoirs employs a float, but in areas where icing is a problem the float control is unsatisfactory due to icing in freezing weather. Some fairly sophisticated arrangements have been employed which do not use a float, but so far as I am aware, the prior arrangements have suffered from one or more of the problems and disadvantages such as difficulties in attaining and maintaining satisfactory adjustment, erratic and undependable behavior under various conditions such as changes in temperature, the necessity for expensive electrical monitoring, liability to be affected by water leakage, difficulty in coping with icing, problems with electrical switches, and the like. Telephone wires are frequently rented for conveying the water level information to the pumping stations, which service is costly and subject to failure. The same holds true when radio signals are used. Therefore, in many localities reliance is still on manual maintenance of the pumps, turning on sufficient pumps to keep up with the demand, and cutting back others before they overflow, even during emergencies such as in case of fire.

An important object of the invention is to provide new and improved apparatus for controlling liquid level in reservoirs and which will overcome the disadvantages, deficiencies, inefficiencies and problems inherent in prior apparatus and practices.

Another object of the invention is to provide new and improved apparatus for automatically maintaining liquid level in a reservoir, and which apparatus is simple, easy to understand and adjust, maintains adjustment reliably, is adapted to be housed in a protected location where it is readily available for observation and adjustment and is fully protected against outside weather conditions, will operate automatically with complete reliability, and is of such durability as to be substantially free from maintenance problems.

A further object of the invention is to provide new and improved apparatus for maintaining liquid level in a reservoir and which is equipped to control one or a plurality of pumps supplying liquid to the reservoir, the apparatus being responsive to head pressure in a main leading from the reservoir.

A further object of the invention is to provide a new and improved apparatus for controlling liquid level in a reservoir, enabling timed, deliberate fluctuations in liquid level in the reservoir for antistagnation or anti-icing purposes.

Yet another object of the invention is to provide a new and improved apparatus for controlling liquid level in a reservoir, and which apparatus is of modest cost, can be operated at minimum expense and maintain continuous high efficiency standards.

In accordance with features of the invention, apparatus is provided for controlling liquid level in a reservoir in accordance with head pressure in a main leading from the reservoir, the apparatus comprising means such as a pressure-sensitive cell for monitoring the head pressure in the main, a pivotally supported balance beam, balance weight means carried by said beam and adapted to be adjusted longitudinally relative to the beam to a setting determinative of a desired liquid level to be maintained in the reservoir by operation of the apparatus; means such as a bellows actuator adjacent to one end of the beam responsive to said monitoring means and cooperative with the balance weight means for controlling the pivotal attitude of the beam substantially in agreement with monitored head pressure, within a range wherein the beam is in one pivotal position when the monitored head pressure is indicative of said desired liquid level and in a second pivotal position when the head pressure is indicative of a liquid level in the reservoir lower than said desired level; and means such as a trip on the beam and electrical switches at the opposite end of said beam for controlling operation of liquid supply means for the reservoir such as one or more pumps in accordance with the pivotal attitude of the beam as controlled by said balance weight means and said monitor-responsive means, so that the liquid supply means will remain inactive in said first position of the beam and will be operated in said second position of the beam to supply the reservoir.

According to other features of the invention, a timer-operated anti-stagnation or anti-icing control device may be provided in association with the balance beam.

Other objects, features and advantages of the present invention will be readily apparent from the following description of certain representative embodiments thereof, taken in conjunction with the accompanying drawings, although variations and modifications may be effected without departing from the spirit and scope of the novel concepts embodied in the disclosure, and in which:

FIG. 1 is a side elevational view of apparatus embodying features of the invention;

FIG. 2 is a top plan view of the apparatus;

FIG. 3 is a fragmental enlarged vertical sectional detail view taken substantially along the line III—III of FIG. 2;

FIG. 4 is a fragmentary vertical sectional detail view taken substantially along the line IV—IV of FIG. 3;

FIG. 5 is a vertical sectional elevational detail view taken substantially along the line V—V of FIG. 1;

FIG. 6 is a fragmentary end elevational view taken substantially along the line VI—VI of FIG. 3;

FIG. 8 is a fragmentary sectional detail view of a main pressure probe which may be used under certain circumstances.

Figure 7:
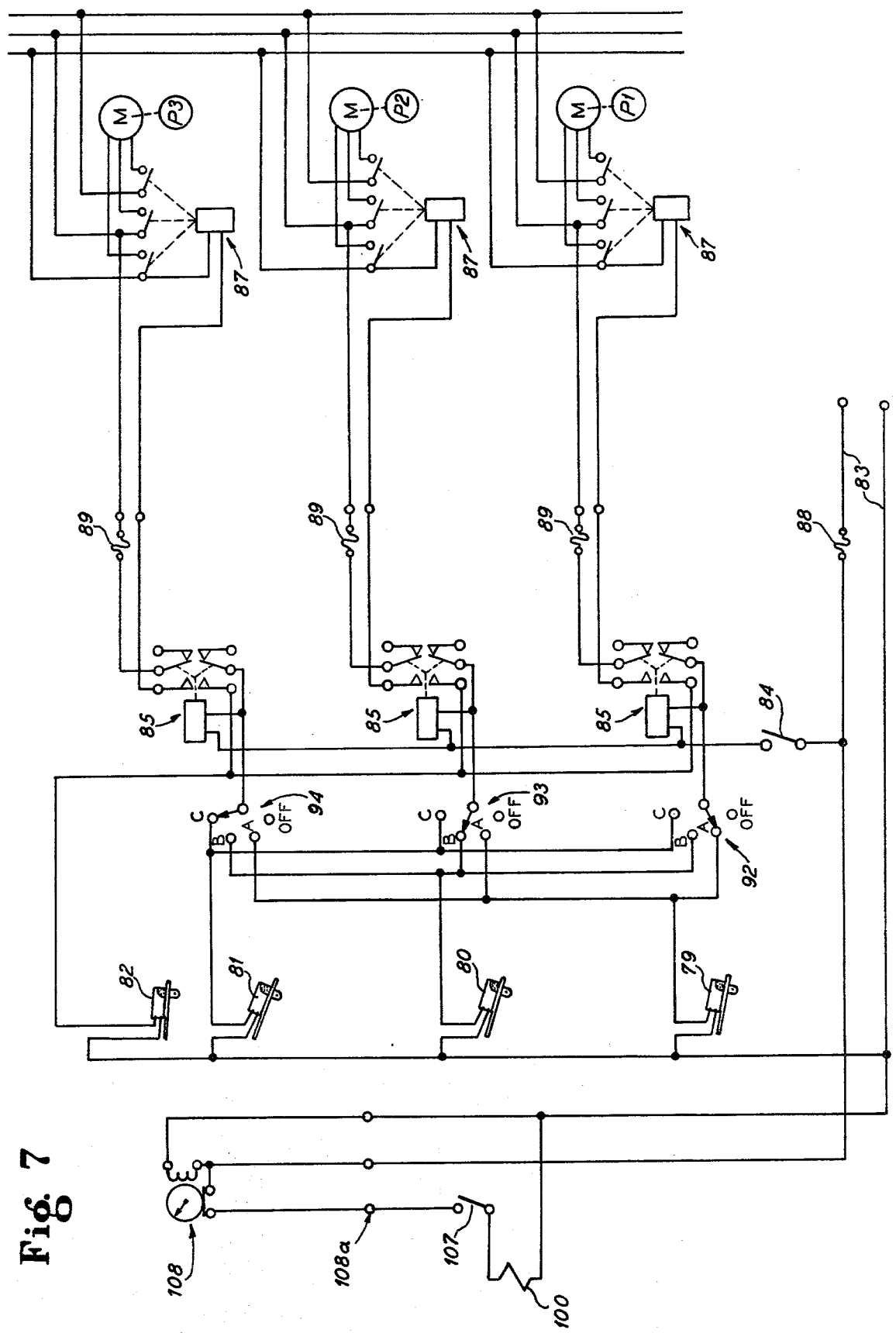
FIG. 7 is an electrical operating circuit diagram.

In a typical apparatus embodying features of the invention and especially suitable for use in a municipal water system, a small compact base 10 will suffice to support at least most of the elements of the apparatus. For example, the unit as mounted on the base 10 may be about 29 inches long, about 6 inches wide and about 10 inches high.

A principal feature of the apparatus is a scale beam 12 which is pivotally mounted adjacent to one end and extends freely in spaced relation over the base 10. Dividing the beam 12 into a relatively long lever portion 12a and a short tail portion 12b is a horizontal axle structure 13 (FIG. 4) projecting to opposite sides of the beam end portion and journaled in anti-friction bearings 14 mounted in a frame 15 comprising spaced upright standards 15a secured in fixed relation on one end portion of the base 10. Lubrication of the bearings 14 is adapted to be effected through a grease gun fitting 17 communicating directly with one of the bearings and with the other of the bearings through a passage 18 in the axle. A counterweight 19 (FIGS. 1–3) is mounted adjustably on a threaded stem 20 projecting from the distal end of the beam tail 12b.

According to the present invention, the beam 12 is calibrated and equipped to assume settings for pounds and feet, having in mind that water column height in a reservoir can be determined in pounds pressure by multiplying by a factor of 2.307. With this information in mind, the lever portion 12a may, as shown in FIGS. 1 and 3, be provided with calibration indicia 21 preferably along the front side of the beam providing a weight (pounds or kilograms) pressure scale along which a selector weight 22 riding slidably on the beam is adapted to be adjusted. A gauging face area 23 (FIG. 5) on the weight 22 facing toward the distal or free end of the beam portion 12a may carry an indicating indicia 24 adapted to be aligned with any selected one of the calibrations along the scale 21, by sliding the weight 22 into the selected position. Thereby, what may be referred to as a primary or general setting is adapted to be effected for the particular liquid level control desired. Then, to attain a more precise or fine trimming of the level in the water column, a smaller weight 25 is adjusted along a scale 27 calibrated at height intervals (feet or meters) of water level and desirably located along the top surface of an auxiliary beam bar 28 which is mounted in longitudinally extending spaced clearance relation above the weight 22 on the beam 12 as by means of spacer column studs 29 at its opposite ends which respectively extend short of the frame 15 at the proximal end portion and the distal end portion of the lever portion 12a, thereby providing a substantial bar length for the height scale 27 along which the weight 25 is adapted to be adjusted by sliding it along the bar 28.

In order to control the pivotal attitude of the beam 12 in operation of the apparatus substantially in agreement with monitored reservoir liquid level head pressure, means in the form of an actuator 30 (FIGS. 3 and 4) are provided at one end, i.e., the tail end 12b, of the beam functioning in cooperation with the balance weight means comprising the weight 19 and the weights 22 and 25. For this purpose, the actuator 30 desirably comprises an expansible bellows 31, carried by the frame 15 in overlying relation to the end portion 12b. On its upper end the bellows 31 is sealed to a closure disk 32 secured in supported relation on the underside of a bridging head element 33 at the top of the frame 15. On its lower end the bellows 31 is sealed to a closure disk 34 which carries a coaxially downwardly projecting conically tipped pivot point element 35 engaged in a generally complementary upwardly opening, frusto-conical pivot bearing socket 37 in the beam tail portion adjacently spaced relative to a vertical plane through the axle 13.

Means are provided for rendering the bellows actuator 30 pressure-responsive so that internal pressure within the bellows 31 will cause it to expand and thereby press the pivot point 35 against the beam 12 causing the beam to swing about its pivotal axis in opposition to the bias of the balance weights 22, 25, and raise the distal end of the beam lever 12a, for example, to the intermediate position shown in FIG. 1 or the full line position substantially fully raised to the limit position shown in FIG. 3. When the pressure drops in the bellows the distal end of the beam lever portion 12a may be permitted to drop to a lower limit position as indicated in dash outline in FIG. 3. For this purpose, the bellows 31 is maintained substantially filled with a transmission fluid 38 such as oil and communicates by means of an oil-filled system including a pressure metering duct 39 (FIG. 1) leading from a head pressure monitoring cell 40 tapped as by means of a pipe 41 into communication with a main 42 which may comprise a standpipe or lead from a standpipe 43 extending from a reservoir 44 which may be a municipal water tank or the like. A shutoff valve 45 may be in control of the pressure conducting pipe 41, and a bleeder valve 45a may be located adjacent to an end of the pressure cell 40 which preferably comprises a generally cup-shaped portion 47 into which water under pressure from the main 42 is tapped by the pipe 41. A generally cup-shaped oil chamber portion 48 to which the duct 39 is coupled, is joined to the portion 47, there being a pressure transmitting diaphragm 49 sealingly clamped between the chambers 47 and 48 to separate the water from the oil. In a preferred form, the cell elements 47 and 48 are of the same standardized size. The flexible diaphragm 49 is of a generally cup shape, with tapered sides, and has a thickened base 50 normally projecting toward the closed end of the chamber portion 47 against which it can safely bottom if there is a pressure surge in the oil-filled transmission system. Oil leakage in the transmission system or pressure surges from the main 42 cause the diaphragm 49 to flex responsively. Should the oil leakage be severe enough, or it becomes necessary to open the oil-filled transmission system, the base 50 is adapted to move toward a seat 51 at the port into a fitting 52 which couples the duct 39 centrally to the closed end of the chamber 48. The base 50 thus acts as a shut-off valve pressing sealing onto the seat 51 as indicated in dash outline in FIG. 1. At either extreme of flexure bottoming of the base 50 avoids overstressing and possible rupture of the diaphragm 49.

At the actuator end of the hydraulic transmission system, the duct 39 is coupled in communication with the bellows 31 by means of a fitting 53 including an elbow 54 (FIGS. 1 and 2) at one end of an elongated hollow T-nipple 55 having therein a passage 57 (FIG. 3) which communicates under the control of an angle needle valve 58 operable by means of a knob 59 with a passage 60 which extends through a connecting nipple 61 secured to the head member 33. The nipple 61 projects to a limited extent into the upper end of the chamber within the bellows 31 in a manner to provide an air space head room 62 accommodating a pressure relieving safety cushion, vibration damping, air bubble in the head of the bellows chamber. Projecting upwardly from the coupling body 55 is a filler and air bleed or purging nozzle 63 communicating with the passage 57 and under the control of a shutoff valve having an operating knob 64.

Means are provided at the distal end of the lever 12a for controlling operation of liquid supply means for the reservoir 44 in accordance with the pivotal attitude of the beam as controlled by the balance weight means and the monitor-responsive actuator means 30. To this end, an upper limit stop is carried in overlying relation to the distal end of the beam lever 12a by a post 67 rising from the base 10, and a lower limit stop 68 is carried by the base 10 in underlying relation to the lever portion 12a. Means comprising a transverse trip arm bar 69 carried by the distal end portion of the beam lever 12a underlies switch trip means comprising one or more, in this instance four, trip lever fingers 70 which operatively overlie the arm 69 and project from respective mercury switch carriers 71 (FIGS. 3 and 6), each of which is equipped with a rocker coupling 72 pivotally connected as by means of a pin 72a to an upwardly projecting mounting stud 73 on a respective dielectric mounting block 74 vertically individually adjustably fastened to the base 10 as by means of a pair of machine screws 75 in opposition to an upward biasing coiled spring 77 thrusting at one end against the base 10 and at the other end into a blind end socket 78 opening downwardly in the block 74. In this manner, the several switch carriers 71 are adapted to be individually adjusted into optimum vertical position relative to the trip arm 69, as best visualized in FIG. 6.

Although for a small capacity reservoir a single supply pump might suffice, a plurality of supply pumps for each reservoir is usual. By way of illustration, therefore, the apparatus is shown as equipped to handle three supply pumps identified as P1, P2 and P3 in FIG. 7. It will be understood, of course, that each of these pumps whether connected to a single water source or to a plurality of wells, will be in supply communication with the reservoir 44 in the usual manner. In the carriers 71, a mercury switch 79 is provided for controlling pump P1, a mercury switch 80 for the pump P2 and a mercury switch 81 for the pump P3, and a holding switch 82. The arrangement of the switch carriers as to adjusted angle of inclination and elevation is such that the switches will be opened and closed sequentially under the control of the beam carried trip arm 68 and the trip fingers 70. All of the mercury switches are connected with a suitable power line 83 through an on-off switch 84 (FIGS. 1, 2 and 7) and respective relays 85, each of which is operatively connected with a respective one of the pump motors, in circuit with starters 87 for the motors. A protective fuse 88 is connected in the power line 83, and respective fuses 89 are connected in the electrical lines between the relays 85 and the pump motors, the fuses being conveniently mounted on the front of the base 10. A suitable terminal array 90 (FIGS. 1 and 2) is mounted on the base 10 adjacent to the switch mounts 71 to facilitate electrical connections for the mercury switches. A suitable electrical terminal array 91 on the adjacent end portion of the base 10 facilitates electrical connection of the pump motors in the operating control circuit.

Flexibility, adaptability and convenience in operations of the pumps P1, P2 and P3 is enhanced by interposing between the control switches 79, 80 and 81 and the relays 85, respective selector switches 92, 93 and 94 operable by means of respective knobs 92a, 93a and 94a accessible on the front of the base 10. Each switch has "off" and "A", "B" and "C" positions. Any pump may be shut down by turning its switch knob to the "off" position. Any desired sequence of operation of the pumps is attained by appropriate adjustment of the associated selector switch 92, 93 or 94 to the "A", "B" or "C" position, and also desirably adjusting the height of the associated mercury switch 79, 80 or 81. For example, an adjustment differential in water column in the reservoir 44 may be attained varying from 3 inches to 6 feet at which the respective pumps are automatically energized in the operation of the apparatus. Therefore, by suitable adjustment of the selector switches any sequence order of operation of the pumps may be selected. In the setting shown in FIGS. 1 and 7, the sequence is for initial operation of the pump P1 followed by the pump P2 and then the pump P3, but this may be varied as and if circumstances dictate. If preferred, of course, any of the pumps may be paired, or all of the pumps may be set through the selector switches to operate substantially simultaneously. In any desired setting, however, the "hold" switch 82 avoids overworking of the lead pump within a desired minimum top fluctuation range.

In a typical normal operating sequence as controlled by the apparatus, and after the balance beam 12 has been adjusted for the maximum water column level desired, and assuming the reservoir 44 has been filled to such maximum level, the water column pressure monitored by the cell 40 causes the actuator 30 to expand and depress the tail portion of the beam 12, thus raising the switch control end of the beam so that the trip arm 69 raises all of the trip levers 70 and thus opens all of the switches 79-82 and places all of the pumps P1-P2-P3 in idle, standby condition. Upon dropping of the water level in the reservoir 44 and thus lowering of the water column the switch control end of the beam 12 is permitted to drift downwardly proportionately until the hold switch 82 is closed so as to prepare the relays 85 for energization. Further, lowering of the water column accompanied by proportional downward drifting of the control end of the beam 12 eventually results in closing of the mercury switch 79, 80 or 81, as the case may be, and in the illustrated example the switch 79, energizing its relay 85 and thereby the motor for pump P1, which may fully replenish the reservoir, and thus cause the beam 12 to open the switches 79 and 82. If the water demand is such as to cause a progression in the water column drop even though the pump P1 is operating, then as the second low level for which the switch 80 has been adjusted is reached, that switch is closed and the pump P2 is cut in. If that does not take care of the situation, and the water level continues to drop, until a third low water level stage is reached, the switch 81 closes due to the continuing downward drift of the control end of the beam 12, and the pump P3 is cut in. Presumably, the combined volume of all three pumps will maintain at least the minimum level in the reservoir 44 under the heaviest emergency demand placed upon it. As the water demand diminishes, and the water level rises, the control end of the lever 12a gradually rises until the maximum water level has been reached in the reservoir 44 and the holding switch 82 is opened to stop the pumps. Accordingly, when the control apparatus has been adjusted, reliable, automatic control of the supply pumps is maintained continuously, responsive to the monitored head pressure in the main 42.

Even in municipalities of modest size, it generally requires numerous wells to supply the water demands. Accordingly, a separate apparatus as described may be provided for each of several clusters of wells to supply a large reservoir or separate reservoirs. In order to avoid overworking the pumps in any given cluster or field, it is desirable to relax the pumps in any given cluster or field over the other clusters or fields. For this purpose, level drop controlling means are provided for adjusting the balance beam 12 to attain the result of relaxing the pumps under its control, without effecting any changes in the basic adjustments in the apparatus. For this purpose, a swing weight in the form of a lever 95 is mounted by means of a pivot 97 on a clevis post 98 fixedly secured to the end of the "foot" bar 28 as by means of a stud 99 which also secures the bar 28 to the underlying post 29 and the post to the beam 12. By swinging the lever weight 95 to its "NORMAL" position where it projects in the direction of the end of the beam 12, substantially adds the weight of the lever 95 to the switch controlling end of the beam 12 and thereby increases its leverage. On the other hand, when the lever weight 95 is swung back into the "STANDBY" position over the bar 78, the increased weight leverage on the beam 12 is relieved. Through this arrangement, substantial differences in the water level in the reservoir 44 can be attained before the pumps are set into operation, simply by swinging the lever weight 95 from what may be termed minimum water level differential where the lever weight is in the extended position as shown in full outline in FIG. 1, as compared with the unextended position as shown in FIGS. 2 and 3. For example, where a water level differential of only a few inches may be desired for normal operating intervals, and during which the lever weight 95 will be placed in its extended position, it may be desirable to provide a relaxed, more or less standby condition in which a water level differential of several feet, such as 2 or more feet, may be tolerated. Nevertheless, the pumps will be ready to operate when the relaxed maximum differential level drop is reached, and especially, the entire system will be ready to operate for any emergency. In municipalities, this is especially advantageous because the lowest fire insurance rating can be claimed by virtue of the continuous availability of maximum water supply to meet any emergency.

By manipulation of the extendible lever weight 95, the apparatus provides for controlled fall or level drop and rise in the reservoir water level to accomplish at least two major purposes, not the least of which is to prevent stagnation so that at least at controlled intervals a substantial volume of fresh, chlorinated water will be added to the water volume in the reservoir. This is especially desirable in hot weather. Where freezing temperatures are encountered, such level drop and rise will avoid icing in the reservoir by bringing in sufficient replenishment of warmer, generally ground temperature water to maintain the reservoir water body temperature above freezing.

According to the present invention, this effect is also easily accomplished automatically in conjunction with or in addition to the extendible lever weight 95 by controlled holding of the balance beam 12 in the off-switch position for a suitable interval to permit the reservoir water level to drop a desired distance, for example, 2 to 6 feet, as preferred, and at any suitable time. For this purpose, a selectively operable level drop controlling means device in the form of a solenoid 100 (FIGS. 1, 2, 3, 5, and 7) is mounted by means of an upstanding plate 101 fixed as by means of screws 102 to the inner edge of the top member 33 of the frame 15 and in overlying relation to the beam 12 and more particularly the adjacent end portion of the bar 28. Normally, the solenoid 100 is deenergized so that its armature 103 depends freely below the solenoid. In this relaxed position of the solenoid a yoke bar 104 carried by a pair of tension springs 105 freely underlies the balance bar 28 so that the balance beam assembly can function in the normal manner. When it is desired to effect an anti-stagnation and/or anti-icing reservoir level drop, the solenoid 100 is energized to draw the yoke bar 104 firmly against the underside of the balance bar 28 and thereby hold the balance beam assembly against drifting downwardly until the desired water level drop has been attained, whereupon the weight of the balance beam assembly relieved from the operational counterbalancing effect of the actuator 30 will overcome the tension of the springs 105 and drop to activate the pump system to at least maintain the dropped level and avoid unnecessary reservoir depletion. When the solenoid 100 is deenergized, the yoke bar 104 drops and releases the balance beam for normal operation. An automatic control electrical circuit for the solenoid 100 includes an on-off control switch 107 desirably located for easy access at the front of the base 10. Automatic operation of the solenoid 100 at suitable selected time intervals such as during daylight and night-time hours when water demand is expected to be at a minimum and stagnation or icing may result is desirably effected by closing the switch 107 and placing control with a timer 108 in the electrical circuit for the solenoid and which will close the solenoid circuit for a suitable interval during which it may reasonably be expected that the reservoir water level will drop sufficiently to effect the anti-stagnation and/or anti-icing function. Connection of the timer 108 with the solenoid 100 and the power line may be through a terminal array 108a (FIG. 2) on the base 10. At the end of the predetermined interval, the time clock opens the circuit, deenergizing the solenoid and releasing the balance beam assembly for normal operation. To permit adjustments of the solenoid 100 for the attainment of controlled reservoir water level drop to a preferred level within a substantial range, for example, at any selected level from 2 to 6 feet, depending upon the relevant conditions, the elevation of the solenoid may be adjusted as, for example, by the provision of vertical adjustment slots 109 in the plate 101 providing vertical clearance for attachment screws 110 by which lateral flanges 111 on the solenoid casing are secured to the mounting plate 101.

In situations where the main size is small in relation to pump volume, thus causing an abnormal back pressure, a probe 112 (FIG. 8) may be mounted as by means of a stem 113 extending through a packing gland 114 in the main 42' with the outer end of the stem 113 suitably coupled to the tap pipe 41. As shown, the probe 112 may comprise a head which is oriented generally axially in the main so that it can be turned by rotation of the stem 113 to have its inlet orifice oriented downstream so that the water pressure obtained by the probe before the monitoring cell 40 will be the same whether water is being pumped to the main or there is merely static water column pressure in the main. In order to permit proper adjustment of the probe 112, the stem 113 may be equipped on its outer portion with a handle 117 which may also serve as a position indicator pointer with reference to indicating indicia 118 such as an orientation notch in the closure cap portion of the gland 114.

Substantial avoidance of water pressure surges being transmitted from the cell 40 to the actuator 30 results from having the metering duct 39 of adequate length and preferably also at least slightly resilient. Excellent results have been obtained with a length of about 10 feet (3 meters) of nylon tubing of about ⅛ inch (4 mm) outside diameter having about a 1/16 inch (2 mm) inside diameter.

Means are desirably provided for releasably locking the balance weights 22 and 25 in adjusted position. For this purpose, the balance weight 22 is constructed in two parts 22a and 22b (FIG. 5) receiving the lever portion 12a of the beam 12 in a recess 120. The weight portions 22a and 22b are normally in a slightly spaced relation to one another, with the recess 120 slightly shallower than the thickness of the bar 12 so that by means of screws 121 the weight portions can be drawn into snug engagement with the beam 12 after a preferred setting has been attained. If desired, the screw tightened relationship of the weight 22 on the beam may be fixed until the screws are loosened. However, a preferred arrangement comprises having tensioning means in the form of coiled compression springs 122 interposed between the heads of the screws 121 and the bottoms of suitable recesses so that the tightening will be under spring pressure wherein the engagement between the gripping faces of the weight elements 22a and 22b will be thoroughly frictional to prevent displacement of the weight 22 from an adjusted position on the beam 12 against normal vibrations or brushing against the weight, but when it is desired deliberately to readjust the weight that can be done by application of moderate manual force.

Similarly, the balance weight 25 comprises two parts, 25a and 25b, also in normal slight spaced gap relation to one another, and means comprising a screw 123 driving against a coiled compression biasing spring 124 draws the elements 25a and 25b into gripping relation on the bar 28 which is received in complementary recesses 125 in the confronting faces of the weight elements 25a and 25b. Thereby the weight 25 may also be either fully tightened on the bar 28, or, as preferred, firmly frictionally tightened so that it will resist normally expected displacement pressures or forces but can be deliberately manually slidably shifted along the bar 28 for readjustment as desired.

It will be understood that variations and modifications may be effected without departing from the spirit and scope of the novel concepts of this invention.

I claim as my invention:

1. In apparatus for automatically controlling liquid level in a reservoir in accordance with head pressure in a main leading from the reservoir:

means for monitoring the head pressure in the main;

a pivotally supported balance beam;

balance weight means carried by said beam and adapted to be adjusted longitudinally relative to the beam to a setting determinative of a desired liquid level to be maintained in the reservoir by operation of the apparatus;

means adjacent to one end of the beam responsive to said monitoring means and cooperative with the balance weight means for controlling the pivotal attitude of the beam substantially in agreement with monitored head pressure, within a range wherein the beam is in a first pivotal position when the monitored head pressure is indicative of said desired liquid level and in a second pivotal position when the head pressure is indicative of a liquid level in the reservoir lower than said desired level;

means at the opposite end of said beam for controlling operation of liquid supply means for the reservoir in accordance with the pivotal attitude of the beam as controlled by said balance weight means and said monitor-responsive means, so that the liquid supply means will remain inactive in said first position of the beam and will be operated in said second position of the beam to supply the reservoir;

said monitoring means comprising a pressure-sensitive hydraulic cell having a chamber in which said head pressure from the main is received;

a reversible diaphragm dividing said chamber into sub-chambers one of which sub-chambers is connected with said main to receive head pressure from the main, the other of said sub-chambers being separated from the head pressure sub-chamber by said reversible diaphragm and being in metered communication with said beam controlling means;

and pressure transmitting fluid in said other of said sub-chambers and substantially filling the metered communication with said beam controlling means;

said diaphragm being reversible from a position wherein it occupies most of the space within said head pressure sub-chamber during low head pressure in said main and the diaphragm being reversible from said head pressure sub-chamber into said other sub-chamber in response to main head pressure to force fluid through the metered communication for operating said means responsive to said monitoring means.

2. Apparatus for controlling liquid level in a reservoir, comprising:

primary means for automatically controlling operation of reservoir replenishing means for normally maintaining an upper liquid level within a narrow fluctuation range in the reservoir during peak and minimum demand intervals;

selectively operable level drop controlling means which is auxiliary to said primary means, for controlling said primary means to permit a level drop substantially below the low end of said fluctuation range of said upper liquid level in the reservoir and then automatic operation of said primary means to return the liquid level to said upper level whereby to prevent stagnation of water in the reservoir during minimum demand intervals or to place the reservoir in a standby condition.

3. Apparatus according to claim 2, wherein said selectively operable means comprise a manually actuatable device.

4. Apparatus according to claim 2, wherein said selectively operable means comprise an automatically timed device.

5. A method of controlling liquid level in a reservoir comprising:

effecting primary control of operation of reservoir replenishing means for normally maintaining an upper liquid level within a narrow fluctuation range in the reservoir during peak and minimum demand intervals;

selectively operating level drop controlling means to modify operation of said reservoir replenishing means for a selected interval of time and thereby effecting controlled level drop substantially below the lower end of said narrow fluctuation range;

then effecting operation of the reservoir replenishing means to return the liquid level to said upper level; and after said time interval disabling operation of said level drop controlling means and effecting normal operation of the reservoir replenishing means to maintain said upper liquid level within said narrow fluctuation range;

whereby to prevent stagnation of water in the reservoir during minimum demand intervals or to place the reservoir in a standby condition, during said time interval.

6. A method according to claim 5, comprising manually actuating a device to effect said controlled level drop.

7. A method according to claim 5 comprising selectively setting and operating an automatically timed device to effect said controlled level drop.

8. In apparatus for automatically controlling liquid level in a reservoir in accordance with head pressure in a main leading from the reservoir, means for monitoring the head pressure in the main, a pivotally supported balance beam, balance weight means carried by said beam and adapted to be adjusted longitudinally relative to the beam to a setting determinative of a desired liquid level to be maintained in the reservoir by operation of the apparatus, means adjacent to one end of the beam responsive to said monitoring means and cooperative with the balance weight means for controlling the pivotal attitude of the beam substantially in agreement with monitored head pressure, within a range wherein the beam is in a first pivotal position when the monitored head pressure is indicative of said desired liquid level and in a second pivotal position when the head pressure is indicative of a liquid level in the reservoir lower than said desired level, means at the opposite end of said beam for controlling operation of liquid supply means for the reservoir in accordance with the pivotal attitude of the beam as controlled by said balance weight means and said monitor-responsive means, so that the liquid supply means will remain inactive in said first position of the beam and will be operated in said second position of the beam to supply the reservoir, said beam controlling means comprising a hydraulic actuator, and means connecting the actuator to the beam, a support, means pivotally mounting said balance beam adjacent to one of its ends such that a tail portion of the beam projects beyond one side of the pivot and a substantially longer beam lever portion projects beyond the opposite side of said pivot, said balance weight means normally biasing the lever in one pivotal direction, said actuator being mounted on said support adjacent to said tail portion and said connection being with said tail portion and the actuator operating responsive to monitored head pressure to counteract the bias of the balance weight means, said opposite end of the beam comprising the distal end of the longer lever portion of the beam, said distal end having a trip arm, pump controlling electrical means including trip switch means mounted adjacent to said arm and having trip means located to be actuated by said trip arm, said switch means comprising a plurality of mercury switches, means adjustably supporting said mercury switches, and each of said mercury switches having a trip lever engageable by said trip arm.

9. Apparatus according to claim 8, including a plurality of pumps, each of said pumps being under the control of a different one of said mercury switches, and means for selectively controlling electrical circuits to operating means for the pumps for activating the pumps in a predetermined order by operation of said trip arm and said switches.

10. In apparatus for automatically controlling liquid level in a reservoir in accordance with head pressure in a main leading from the reservoir:
means for monitoring the head pressure in the main;
a pivotally supported balance beam;
balance weight means carried by said beam and adapted to be adjusted longitudinally relative to the beam to a setting determinative of a desired upper liquid level to be maintained normally within a narrow fluctuation range in the reservoir by operation of the apparatus during peak and minimum demand intervals;
means adjacent to one end of the beam responsive to said monitoring means and cooperative with the balance weight means for controlling the pivotal attitude of the beam substantially in agreement with monitored head pressure, within a range wherein the beam is in a first pivotal position when the monitored head pressure is indicative of said desired liquid level and in a second pivotal position when the head pressure is indicative of a liquid level in the reservoir lower than said desired level;
means at the opposite end of said beam for controlling operation of liquid supply means for the reservoir in accordance with the pivotal attitude of the beam as controlled by said balance weight means and said monitor-responsive means, so that the liquid supply means will remain inactive in said first position of the beam and will be operated in said second position of the beam to supply the reservoir; and
selectively operable level drop controlling means auxiliary to and operatively related to said balance beam for controlling said beam without altering adjustment of said balance weight means to prolong said first position of the beam for thereby selectively attaining reservoir level drop below the lower limit of said fluctuation range of said desired liquid level before said liquid supply means are controlled by said operation controlling means to supply the reservoir.

11. Apparatus according to claim 10, wherein said selectively operable level drop controlling means comprises a solenoid actuated device.

12. Apparatus according to claim 10, wherein said selectively operable level drop controlling means comprises an extensible element carried by said balance beam.

13. Apparatus according to claim 12, wherein said extensible element comprises a pivotally mounted lever movable between an extended position and a retracted position.

14. In apparatus for automatically controlling liquid level in a reservoir in accordance with head pressure in a main leading from the reservoir, means for monitoring the head pressure in the main, a pivotally supported balance beam, balance weight means carried by said beam and adapted to be adjusted longitudinally relative to the beam to a setting determinative of a desired upper liquid level to be maintained normally within a narrow fluctuation range in the reservoir by operation of the apparatus during peak and minimum demand intervals, means adjacent to one end of the beam responsive to said monitoring means and cooperative with the balance weight means for controlling the pivotal attitude of the beam substantially in agreement with monitored head pressure, within a range wherein the beam is in a first pivotal position when the monitored head pressure is indicative of said desired liquid level and in a second pivotal position when the head pressure is indicative of a liquid level in the reservoir lower than said desired level, means at the opposite end of said beam for controlling operation of liquid supply means for the reservoir in accordance with the pivotal attitude of the beam as controlled by said balance weight means and said monitor-responsive means, so that the liquid supply means will remain inactive in said first position of the beam and will be operated in said second position of the beam to supply the reservoir, an elongate base, supporting frame means mounted adjacent to and projecting upwardly on one end portion of said base, a pivot axle carried by said frame means and mounting said balance beam with a relatively short tail portion of the beam extending toward said one end of the base and carrying an adjustable counterweight, a substantially longer level portion of the beam extending over said base toward the opposite end of the base, said level portion carrying a longitudinally adjustable balance weight, a bar extending longitudinally over and mounted at its opposite ends on said lever portion is spaced relation above said balance weight and carrying a second balance weight slidably adjustable therealong, stop means carried by said base and limiting said lever portion to a limited range of vertical swinging movement, a trip arm carried by the distal end portion of said lever portion, electrical control switches having trip levers overlying said trip arm and including individually vertically adjustable mounts carried by said base, respective pumps having electrically operative driving means controlled by respective ones of said switches, said monitoring means comprising a pressure-sensitive cell in pressure communication with the main and having a metered hydraulic transmission connection with said means for controlling pivotal attitude of the beam, said pivotal attitude controlling means comprising a hydraulic pressure bellows actuator supported by said frame means in overlying relation to said beam tail portion, a pivot point connection between said tail portion and said actuator whereby hydraulic pressure expansion of said bellows actuator causes depression of said tail portion and thereby raising of said lever portion of the beam towards upper limit of the stop means and tripping of said switches to an open switch position and decrease in pressure in said actuator relaxing pressure on said tail portion and permitting the lever portion of the beam to drop toward the lower limit of the stop means and permitting the switches to close, extensible and retractible lever extension means on the lever portion for selectively applying additional leverage weight to the lever portion supplemental to and without readjustment of said balance weights, and selectively timed solenoid-actuated means carried by said supporting frame and operable to apply limited counteracting lifting force to said lever portion for limited duration liquid level drop below the lower limit of said fluctuation range of said desired liquid level.

15. In apparatus for controlling liquid level in a reservoir in accordance with head pressure in a main leading from the reservoir:
  liquid supply means for the reservoir;
  means for operating said supply means on demand for replenishing the reservoir;
  means for controlling said operating means including a monitoring device comprising a pressure-sensitive hydraulic cell comprising a chamber having therein a reversible diaphragm separating the chamber into a head pressure sub-chamber and a transmission sub-chamber which sub-chambers are sealed from one another by the diaphragm;
  means effecting communication between the main and the head pressure sub-chamber;
  a resilient plastic metering tube in pressure transmitting connection with said controlling means and of a length and resilience to substantially absorb and prevent transmission of surge shocks from said monitoring means device to said controlling means;
  and transmission liquid substantially filling said metering tube and said transmission sub-chamber, and said diaphragm when low head pressure in the main is monitored by the monitoring device and the diaphragm projecting into said head pressure subchamber;
  said diaphragm being reversible into said transmission sub-chamber when high head pressure in the main is monitored in the monitoring device and wherein the diaphragm drives the transmission liquid through the the metering tube to said controlling means.

16. Apparatus according to claim 15, wherein said metering tube comprises a substantial length of nylon tubing having an inside diameter and length to effect the metering function.

17. Apparatus according to claim 15, wherein said operating means comprise a beam, means pivotally mounting the beam adjacent to one end whereby a relatively short tail portion of the beam projects to one side of the beam pivot and a relatively long beam portion extends to the other side of said beam pivot, a hydraulic actuator adjacent to said tail portion, said metering tube communicating with said hydraulic actuator for transmitting the transmission liquid to operate the actuator in response to high head pressure as monitored by said monitoring means, and means controlled by said longer portion of the beam for controlling operation of the supply means.

18. Apparatus according to claim 15, wherein said means effecting communication between the main and head pressure sub-chamber comprises a probe mounted with a head of the prove having an inlet orifice oriented downstream so that water pressure obtained by the probe for the monitoring cell will be the same whether the reservoir is being replenished or there is merely static water column water pressure in the main.

19. Apparatus according to claim 18, including means externally of the main to permit proper adjustment of the probe relative to the main.

20. In apparatus for automatically controlling liquid level in a reservoir in accordance with head pressure in a main leading from the reservoir:
  means for monitoring the head pressure in the main;
  a support;
  a balance beam;
  pivot means pivotally mounting said balance beam on a longitudinal axis adjacent to one of its ends to said support such that a short tail portion of the beam projects beyond one side of the pivot means and a substantially longer beam lever portion projects beyond the opposite side of said pivot means;
  a balance weight carried by said longer beam lever portion and normally biasing the beam to depress said longer beam lever portion and raise said tail portion, said weight being adapted to be adjusted longitudinally relative to the beam to a setting determinative of a desired liquid level to be maintained in the reservoir by operation of the apparatus;
  a hydraulic actuator fixedly mounted in position on said support and having movable means connecting said actuator to said tail portion;

said actuator operating responsive to monitored head pressure to apply reaction pressure between said support and said tail portion whereby to depress said tail portion and counteract the bias of said balance weight to raise said longer beam lever portion substantially in agreement with monitored head pressure;

said actuator permitting said tail portion to rise and said lever portion to drop when the monitored head pressure is indicative of a liquid level in the reservoir lower than said desired liquid level;

means at the distal end portion of said longer beam lever portion for controlling operation of liquid supply means for the reservoir in accordance with the pivotal attitude of the beam as controlled by said balance weight and said hydraulic actuator, so that the liquid supply means will remain inactive in said upper position of the lever portion and will be operated in said lower position of the lever portion to supply the reservoir;

an adjustable counterweight attached to said tail portion;

said balance weight being slidably mounted on said lever portion;

weight scale indicia on said lever portion to facilitate setting of said slidable balance weight;

a scale bar mounted on the lever portion and overlying the balance weight in spaced relation;

a balance weight slidably mounted on said scale bar;

a distance interval scale on said bar calibrated at height intervals of water level and along which said balance weight on the bar is adjustable for fine trimming with respect to the desired liquid level in the reservoir;

and a selectively operable weight element mounted on the balance beam adjacent to the distal end of said lever portion and extendible into a lever extended position and into a retracted position.

21. Apparatus according to claim 20, wherein said extendible element comprises a pivotally mounted lever swingable between extended and retracted positions.

22. Apparatus according to claim 20, wherein said means at the distal end portion of said longer beam portion for controlling operation of said liquid supply means comprises a transversely extending trip arm, and electrical switch means mounted adjacent to said distal end portion of the lever portion for controlling supply means pumps and having tripper means engageable by said trip arm in the upper position of said lever portion.

23. Apparatus according to claim 20, wherein said weights have means for tightening them in place after they have been adjusted to the desired adjustment positions on respectively said lever portion and on said bar.

* * * * *